UNITED STATES PATENT OFFICE.

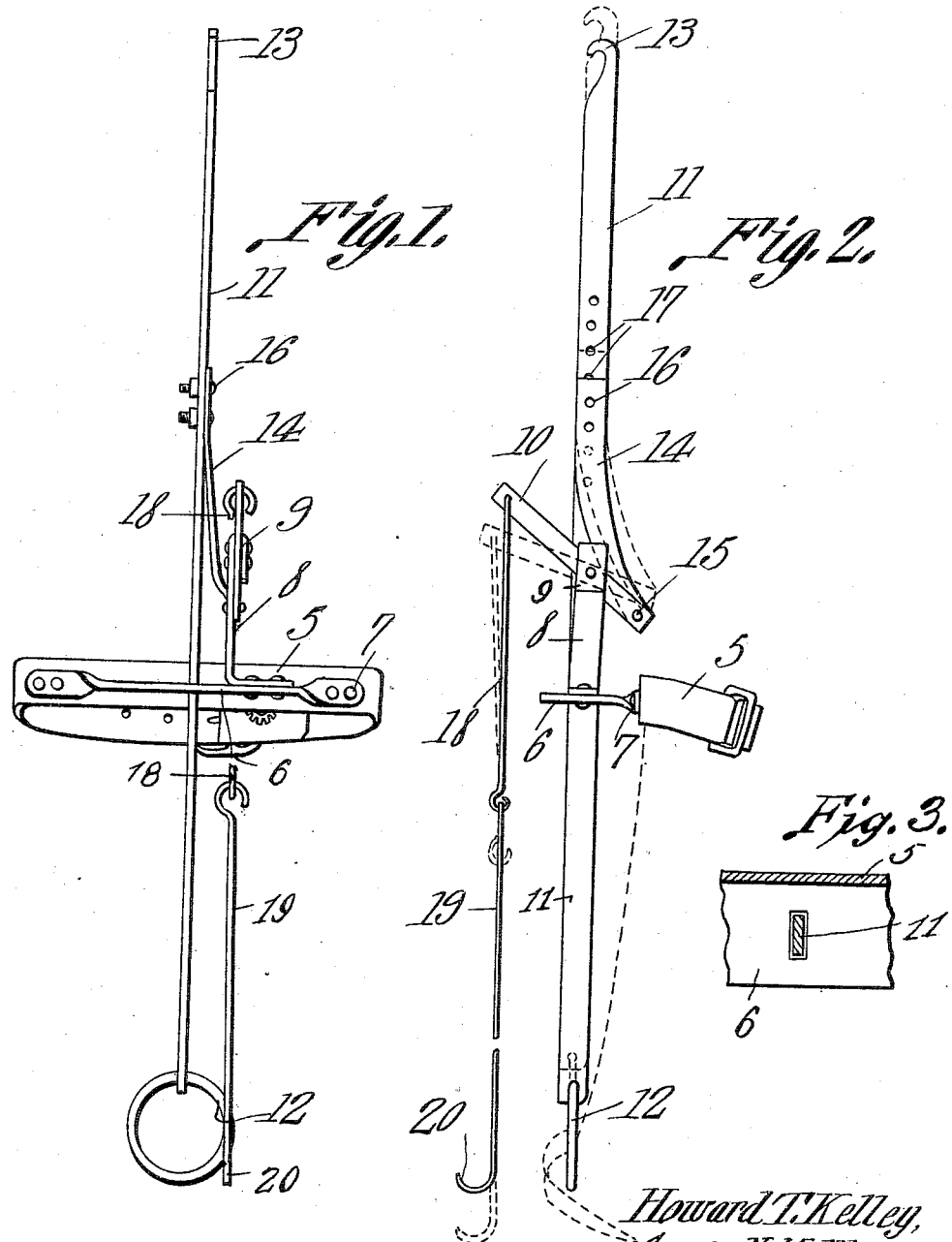

HOWARD T. KELLEY, GEORGE N. MATTHEWS, AND GEORGE F. DAVIS, OF SILVER VALLEY, TEXAS.

ANIMAL-POKE.

971,618.   Specification of Letters Patent.   Patented Oct. 4, 1910.

Application filed May 13, 1910. Serial No. 561,137.

*To all whom it may concern:*

Be it known that we, HOWARD T. KELLEY, GEORGE N. MATTHEWS, and GEORGE F. DAVIS, citizens of the United States, residing at Silver Valley, in the county of Coleman, State of Texas, have invented a new and useful Animal-Poke, of which the following is a specification.

It is the object of the present invention to provide an improved animal poke and the invention aims primarily to provide a device of this class which will cause annoyance to the animal wearing the same whether an attempt is made to crawl beneath or over the bars of a fence or gate.

Briefly stated, the invention resides in a head attached member which carries a sliding bar at the lower end of which is loosely mounted a nose ring which is of course secured to the animal's nostrils at the time of applying the device. This bar at its upper end is hooked so that should the animal wearing the poke attempt to crawl beneath a fence or gate rail, the rail will engage with the hook and pull upwardly upon the bar and consequently pull upwardly upon the nostrils and due to the fact that the bar is supported by a rocking member which carries a depending hooked rod, the same result will be secured should the animal attempt to pass over a fence or gate rail.

Another feature of the invention resides in so connecting the rocking member and the bar that the device may be applied to animals varying quite considerably in size.

With the above and other objects in view, the invention resides in the construction and arrangement of parts substantially as shown in the accompanying drawings in which;—

Figure 1 is a front elevation of the poke embodying the present invention. Fig. 2 is a side elevation thereof, the device being shown in normal position in full lines and in dotted lines in the position assumed when its hooked members engage with a fence rail. Fig. 3 is a horizontal sectional view taken in a plane directly above the supporting plate of the device.

In the drawings, the device is illustrated as embodying in its structure a head strap which is indicated by the numeral 5, this strap being of such length as to be buckled around the forehead and horns of the animal to which the poke is to be applied. A bar 6 has its ends riveted or otherwise secured as at 7 to the strap 5 and this bar, when the strap is properly positioned upon the head of the animal, extends directly across the animal's forehead and supports the other members of the device as will now be clearly explained.

A bracket 8 is fixedly mounted upon the bar 6 and upstands from the same and as illustrated, this bracket is formed from a strip of metal, the upper end portion of which is overturned or bent upon itself as at 9 and a rocking member 10, also in the form of a strip of metal, is pivoted in the overbent portion 9 of the bracket so that one of its ends will project rearwardly beyond the bracket and the other end will project forwardly therebeyond. This rocking member 10 performs two functions, one of which is to support for vertical sliding movement, a bar carrying the nose ring of the device and this bar is indicated in the drawing by the numeral 11 and is slidably mounted through a slot formed between the ends of the strip 6, the bar being provided at its lower end with a nose ring 12 of the ordinary or any preferred form. At its upper end, this bar 11 is formed with a hook 13 which has its bill presented forwardly, when the device is in place upon the head of an animal, so that should the animal attempt to crawl beneath a fence or gate rail the said hook will engage with the rail and an upward pull will be exerted upon the bar causing a corresponding movement of the nose ring 12 and a forcible upward pull to be exerted upon the nostrils of the animal. An arm indicated by the numeral 14 is rigidly though adjustably secured at its upper end to the bar 11 and projects downwardly laterally therefrom and at its lower end is pivoted as at 15 to the rear end of the rocking member 10, and in securing this arm upon the bar 11, bolts 16 are secured through the upper end portion of the arm and through openings 17 formed in the bar 11, the engagement of these bolts through the openings 17 being an interchangeable one so that the proper adjustment may be secured. In other words, by varying the connection between the bar 11 and arm 14, the bar may be raised or lowered with respect to the head strap 5 and consequently the device may be quickly and easily adapted to the head of any farm animal of ordinary size and accustomed to wear such devices as the present one. From the foregoing it will be readily understood that while the bar 11 is slidably mounted through the strip 6, it is nevertheless supported for sliding movement by the rocking member 10, and owing to the fact that the weight of the bar is much greater than the weight of the forward portion of the said rocking member, the rear end of the rocking member will be normally depressed. Advantage is taken of this fact by suspending from the forward end of the rocking member a fence rail engaging member which is in the form of a two-part rod, one section of which is indicated by the numeral 18 and the other by the numeral 19, these sections being pivotally connected and the section 19 being formed at its lower end with a forwardly presented hook 20. The rod comprising the two sections 18 and 19 hangs directly in front of the animal as will be readily understood so that should the animal attempt to pass over a fence rail instead of beneath the same as before described, the hook 20 will engage with the rail and the forward end of the rocking member 10 will be pulled down thereby elevating its rear end and imparting movement in a corresponding direction to the bar 11, resulting in an upward pull being exerted upon the nose ring as in the instance of the engagement of the hook 13 with a fence rail. From the foregoing, it will therefore be understood that whether the animal wearing the poke attempts to pass beneath or over a fence rail, the result will be the same.

What is claimed is:—

1. In a device of the class described, an attaching member, a bar slidably mounted upon the member, a nose ring at the lower end of the bar, a rocking member supported upon the attaching member and having connection with the bar, and a depending rod carried by the rocking member and provided at its lower end with a hook.

2. In a device of the class described, an attaching member, a bar slidably mounted upon the member, a nose ring carried at the lower end of the bar, a rocking member supported upon the attaching member, an arm rigidly secured to the bar and pivotally to the rocking member, and a depending hooked rod carried by the rocking member.

3. In a device of the class described, an attaching member, a bar slidably mounted upon the attaching member, a nose ring carried at the lower end of the bar, a rocking member supported upon the attaching member, a rigid arm adjustably carried by the bar and having pivotal connection with the rocking member, and a hook depending rod carried by the said rocking member.

4. In a device of the class described, a head strap, a bar carried thereby, a bracket fixed upon the bar, a rocking member mounted upon the bracket, an arm pivoted to the rocking member at the rear end thereof, a bar slidably mounted through the bar upon the head strap and having the said arm secured thereto, the said sliding bar at its upper end being formed with a hook, a nose ring at the lower end of the sliding bar, and a depending hooked rod carried at the forward end of the rocking member.

In testimony that we claim the foregoing as our own, we have hereto affixed our signatures in the presence of two witnesses.

HOWARD T. KELLEY.
GEORGE N. MATTHEWS.
GEORGE F. DAVIS.

Witnesses:
H. D. SMITH,
A. F. MARTIN.